United States Patent [19]

Fort, III

[11] Patent Number: 4,626,665
[45] Date of Patent: Dec. 2, 1986

[54] METAL OVERSHEATHED ELECTRICAL RESISTANCE HEATER

[75] Inventor: William C. Fort, III, Katy, Tex.

[73] Assignee: Shell Oil Company, Houston, Tex.

[21] Appl. No.: 747,592

[22] Filed: Jun. 24, 1985

[51] Int. Cl.$^4$ .................. H05B 3/40; H05B 3/06
[52] U.S. Cl. .................. 219/534; 219/537; 338/242; 338/238
[58] Field of Search ............ 219/523, 534, 537, 541, 219/544, 552, 553; 29/615; 338/214, 218, 238, 239, 242, 273, 274; 166/250, 302

[56] References Cited

U.S. PATENT DOCUMENTS

| | | | |
|---|---|---|---|
| 2,036,788 | 4/1936 | Abbott | 338/238 |
| 2,247,869 | 7/1941 | Beers | 338/214 X |
| 2,453,313 | 11/1948 | Gordon | 338/214 X |
| 2,499,961 | 3/1950 | Lennox | 338/218 X |
| 2,703,355 | 3/1955 | Hagglund | 338/238 X |
| 2,767,288 | 10/1956 | Lennox | 338/238 |
| 2,987,689 | 6/1961 | Lennox | 338/238 |
| 3,080,543 | 3/1963 | Boggs | 338/273 |
| 3,340,382 | 9/1967 | Lennox | 219/544 |
| 3,369,209 | 2/1968 | Edwin et al. | 338/238 |
| 3,538,282 | 11/1970 | Dugger | 338/214 |
| 3,657,520 | 4/1972 | Ragault | 219/553 |
| 3,813,771 | 6/1974 | Skogland | 29/615 |
| 3,898,431 | 9/1975 | House et al. | 219/534 |
| 4,319,127 | 3/1982 | Lindstrom et al. | 219/523 |
| 4,349,727 | 9/1982 | Churchill | 219/544 |
| 4,468,556 | 8/1984 | Cunningham et al. | 219/523 |
| 4,536,660 | 8/1985 | Tetro | 338/214 X |

Primary Examiner—E. A. Goldberg
Assistant Examiner—M. M. Lateef

[57] ABSTRACT

A corrosion-resistant long heater is formed by encasing segments of metal-sheathed, mineral-insulated, electrical resistance heating elements within a metal oversheath which oversheath is substantially completely impermeable and is compressed inwardly to create metal-to-metal contacts between the sheath and the encased elements.

5 Claims, 6 Drawing Figures

METAL OVERSHEATHED ELECTRICAL RESISTANCE HEATER

RELATED APPLICATIONS

The present invention is related to inventions described in the following commonly assigned patent applications: Ser. No. 597,764 filed Apr. 6, 1984, by P. VanMeurs and C. F. Van Egmond on heating long intervals of subterranean earth formations with electrical resistance cable heaters capable of operating at 600°–1000° C. and having patterns of heat generating core cross-sections correlated with the pattern of heat conductivity within the earth formations. Application Ser. No. 658,238 filed Oct. 5, 1984, by G. L. Stegemeier, P. VanMeurs and C. F. Van Egmond, on logging a well while heating it by extending a measuring-instrument conduit into the heated zone beside the heater and operating a spooling means for raising and lowering a temperature logging device within the conduit. Application Ser. No. 690,700, filed Jan. 11, 1985, by C. F. Van Egmond and P. VanMeurs on a long electrical resistance heater cable containing an electrically conductive core surrounded by mineral insulating material and a steel sheath with the sheath and core being swaged to provide different core thicknesses and heating capabilities at different locations along the cable. The disclosures of those applications are incorporated herein by reference.

BACKGROUND OF THE INVENTION

The present invention relates to an electrical resistance heater. More particularly, it relates to such a heater containing at least one heating element which comprises an electrically conductive core surrounded by insulation and a metal sheath and also a metal oversheath which is substantially completely impermeable and is compressed inwardly to provide metal-to-metal contacts between the oversheath and the internal elements. The invention provides such a heater which can be arranged to operate for long times at high temperatures in highly corrosive atmospheres. For example, such a heater can be arranged to heat a 1000 ft. long section of a well borehole at temperatures exceeding about 600° C. for a number of years.

SUMMARY OF THE INVENTION

The present invention relates to an elongated well heater in which a tubular metal oversheath encases both a plurality of metal-surfaced heating strands and at least one other metal-surfaced strand. Those metal strands are each at least substantially parallel to each other and to the oversheath. The oversheath is compressed radially inward to establish metal-to-metal contact between it and the metal surfaced strands. The resultant assembly is spoolable and substantially impermeable throughout its length. The heating strands include a plurality of electrically conductive cores which cores are capable of resistive heating, are surrounded by solid insulation contained within a metal sheath and positioned and interrconnected in an arrangement providing a combination of electrical resistance per unit length of well heater such that the heater is capable of generating heat at different rates along different portions of its length. A means is provided for supplying electrical current to the heating strands.

The term "strand" is used herein to include a wire, cable, bar or tubular strand.

DESCRIPTION OF THE INVENTION

The present invention is, at least in part, premised on a discovery that, particularly for long heaters to be operated in subterranean wells, a heater of the present type is exceptionally easy to construct and arrange for use in numerous situations. The inwardly compressed impermeable oversheath provides a convenient way of ensuring stability against permeation, corrosion, or the like of the heating elements. It is particularly effective in situations in which individual heating elements cannot be manufactured with core sizes large enough in length or diameter or sheaths with adequate thickness, strength, or metallurgical properties and/or situations in which a heater should contain end-to-end or side-by-side connected heating elements, or situations in which multiple heating elements are to be connected in parallel and situated side by side at different contiguous distances along the heater in order to achieve a desired power output or power density with a minimum of supplied voltage and/or with different locations along the heater, etc.

The present invention is particularly advantageous where metal joining operations such as welding, brazing, or the like, need to be done in controlled manufacturing conditions in order to form a metal tube or sheath which is substantially completely impermeable through substantially all of its length.

The present heater and the way it can be made provide a relatively convenient method for interconnecting heater elements having different core resistivities and/or cross-sectional areas or configurations, or materials, to form a spoolable elongated heater capable of heating at different rates along different portions of its length. Such methods and devices can advantageously be used as described in the 597,764 patent application.

Figure 1:
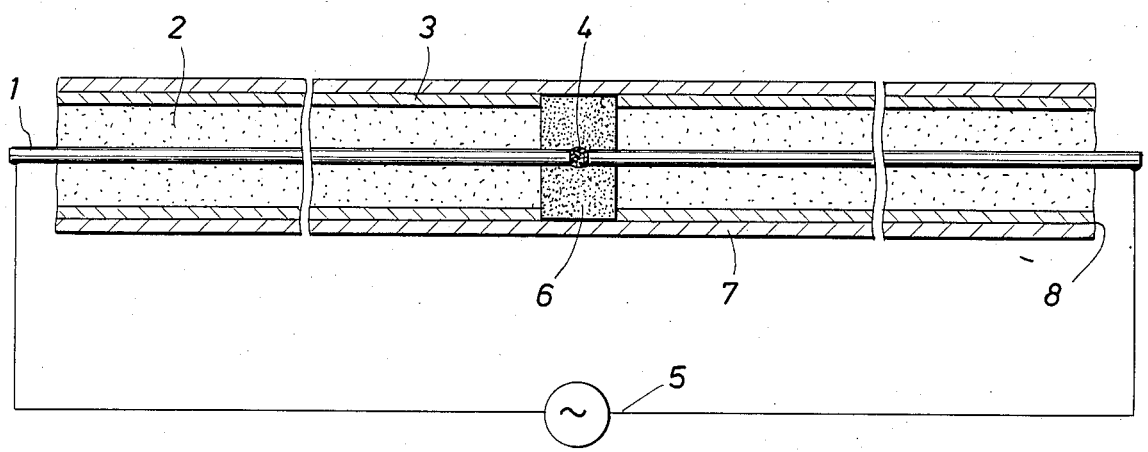
FIG. 1 is a lengthwise view of a portion of a heater of the present invention.

FIG. 1 shows a central portion of a heater of the present invention. The illustrated portion includes a plurality of heater elements which each contain an electrically conductive core 1 surrounded by solid (granular, layered or monolithic) heat resistant insulation 2 within a metal sheath 3. The heater elements are electrically connected to each other in series by welds 4 (and/or brazes, or metal connectors, etc.) joining their electrically conductive cores.

A power supply system 5 is connected to supply an electric current to heater elements.

The interconnected portions of heater cores 1 are surrounded by portions of heat resistant solid insulation 6. Both the interconnected heater cores and the surrounding insulating materials are surrounded by a metal oversheath 7 which is compressed inwardly to create metal-to-metal contacts, such as shown at 8, between the metal surfaces of the oversheath and the metal strands which it surrounds, e.g., heater element sheaths 3. The portions 6 of the insulating material are preferably initially installed as preformed solid masses which become crushed into masses of granules filling the spaces between the cores 1 and oversheath when the oversheath is compressed inwardly. The inward compression of the oversheath can be effected by swaging, drawing, or the like.

Figure 2:
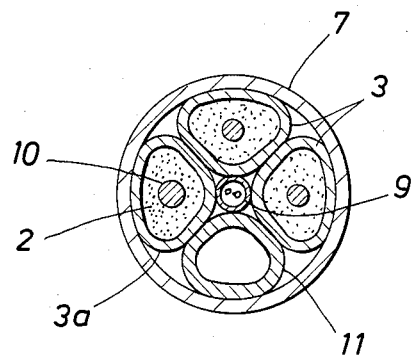
FIG. 2 is a cross-sectional view of such a heater in which a plurality of metal strands inclusive of heater cables and other strands are surrounded by metal oversheath.

FIG. 2 shows a cross section through a heater of the present invention in which a plurality of kinds of metal strands are contained within a metal oversheath, such as oversheath 7. In the embodiment shown, the internal strands include a pair of heater cables which are surrounded by metal sheaths, such as sheaths 3. One internal element comprises a thermocouple cable which is surrounded by a metal sheath 9. One internal element comprises an electrical power supply cable which contains a relatively large and highly conductive electrical conductor core 10 which is surrounded by solid heat resistant insulation 2 and a metal sheath 3a. The other internal element comprises a metal tube 11. A tubular strand, such as 11, can be used as a "mini-well" through which a slender logging device, such as a thermocouple can be moved within a zone being heated, or used as a structural member or can be replaced or accompanied by a structure member such as a wire line or rod, etc.

As shown a metal oversheath, such as oversheath 7, is compressed inwardly to create metal-to-metal contacts between it and the metal surfaces of the internal metal strands. And, as indicated in the figure, where a metal oversheath contains hollow or deformable metal strands, it is preferably compressed inwardly to an extent causing sufficient deformation of the internal strands to ensure good heat conductive metal-to-metal contacts between the walls of those strands and the wall of the oversheath, without deforming those elements far enough to reduce their effectiveness for their intended purpose.

In general, mineral insulated electrically resistive heating cables, electrical interconnections of their conductive cores and/or electrical power supplies, mineral sheathed power supply cables, thermocouple cables and metal tubes, cables, bars, wires, etc., suitable for use in the present invention can comprise known and available devices and/or techniques. Such items which are particularly suitable for use in well heaters are described in greater detail in the cross-referenced patent applications. Those patent applications also describe situations and procedures for which the present heaters and processes for forming heaters are particularly suitable, for example, in respect to heating long intervals of subterranean earth formations encountered by wells.

Figure 3:
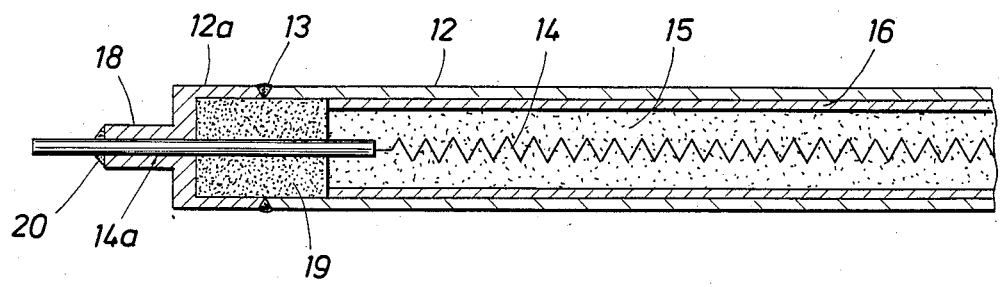
FIG. 3 is a lengthwise view along a portion of a heater of the present invention with a heating element core which is electrically connected to the metal oversheath.

FIG. 3 shows a portion of the present type heater in which the conductive core of an internal heating element and the metal of the oversheath are welded together so that they form a ground connection for heating as well with the conductive cores electrically connected to a power supply connected between the conductive core and ground. In this embodiment a metal oversheath 12 is joined by a circumferential weld 13 to an endpiece 12a. The oversheath is compressed radially inward around an internal heater element having a resistive heating core 14 which is electrically connected to the endpiece conductor core 14a. The central portion of the resistor 14 is surrounded by compacted particles of solid insulating material 15 and a metallic sheath 16. At least the central portion of the oversheath 12 is compressed radially inward into metal-to-metal contact with the heater sheath 16. The endpiece 14a of the heater resistance is preferably surrounded by a preshaped body of solid insulating material 19. The shaped endpiece 12a of the oversheath is slipped around the conductor 14a and electrically connected to it by a circumferential weld 20.

Figure 4:
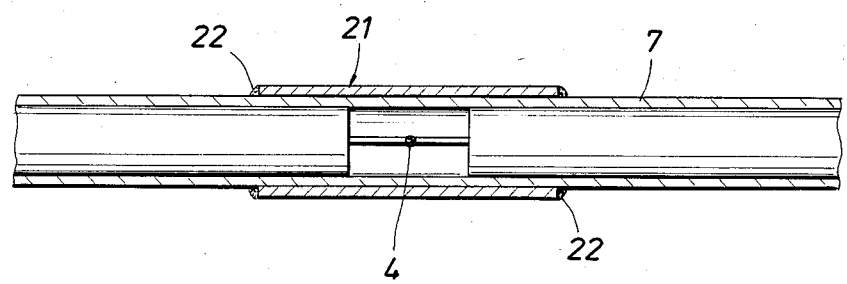
FIG. 4 shows a method of stiffening a portion of the present heater relative to bending stresses.

FIG. 4 shows an embodiment in which a short sleeve 21 of metal is attached around the oversheath 7, for example by circumferential welds 22, (or by shrink-fitting, brazing, etc.) to increase the resistance to kinking of the heater.

Figure 5:
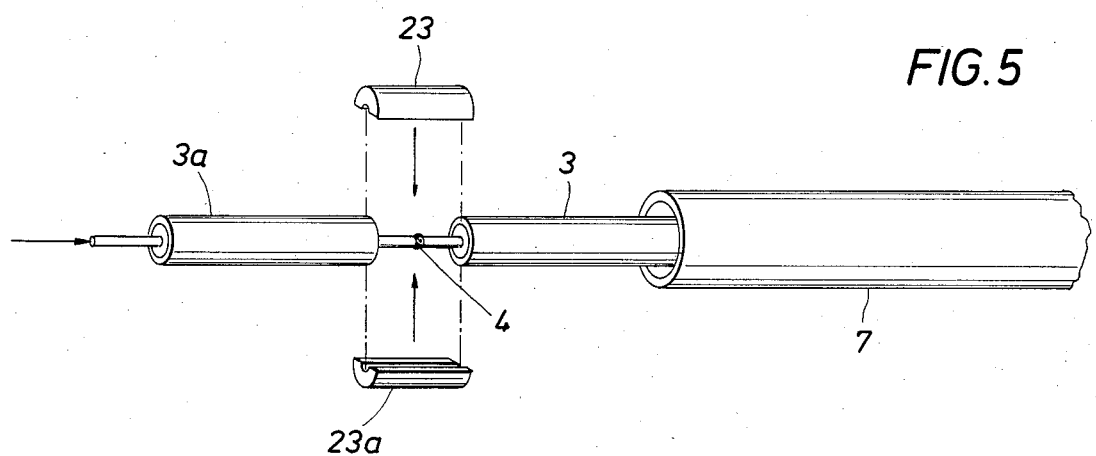
FIG. 5 shows a process of assembling a heater of the present invention with a series of end-to-end connected heating elements.

FIG. 5 shows a method of assembling a heater of the present type. A series of internal heater element segments having metal sheaths 3 and 3a are interconnected by means of connections, such as welds 4, joining their conductive cores. Matching sections 23 and 23a of preshaped solid compressed bodies of powdered solid insulating material are fitted around the interconnected conductive cores. The diameters of the fitted sections are preferably arranged to be somewhat larger than those of the heating element sheaths 3, but smaller than the internal diameter of the oversheath 7. Such an assembly of heater elements, along with other metal tubes such as thermocouple tube 9, or mini-well tube 11, of FIG. 2 etc., can be drawn into the oversheath 7 prior to the oversheath being compressed internally to establish the metal-to-metal contacts between the external surfaces of the internal tubes. The resulting crushing of the preshaped bodies of insulating material ensures a distribution and compaction of the granules formed from them within the spaces surrounding the interconnected heater element cores.

Figure 6:
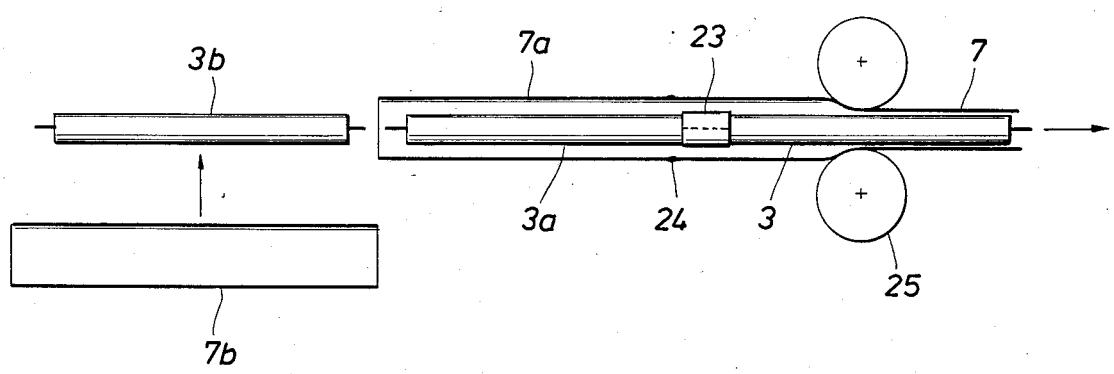
FIG. 6 shows a process of assembling a heater of the present invention while advancing it through a swaging machine.

FIG. 6 shows an alternative method of constructing the heater, which method is especially suitable for exceptionally long heaters. As shown, a section of oversheath 7, which is joined to a section 7a by a circumferential weld 24, is being drawn through the rolls of a roller swager 25 for compressing the oversheath radially inward. Internal heater element sections having sheaths 3 and 3a around insulated electrically conductive cores, are being interconnected by core-joining welds, which are preferably surrounded by molded sections of insulating material 23. The heater elements are being extended, by additions of additional sections and advanced toward the swager, as shown by the arrows. Those heater elements each have a sheath such as 3b and are subsequently surrounded by sections of the oversheath, such as those of 7, 7a, and 7b, to which more sections are being added, as the assembly moves toward the swaging machine 25.

What is claimed is:
1. A well heater comprising:
a tubular metal oversheath encasing both a plurality of metal surfaced heating strands and at least one other metal surfaced strand;
said metal surfaced strands being at least substantially parallel to each other and the oversheath;
said oversheath being compressed radially inward to establish metal-to-metal contact between it and the strands within an assembly which is spoolable and is substantially impermeable throughout its length;

said heating strands including a plurality of electrically conductive cores which cores are capable of resistive heating, are surrounded by solid insulation contained within a metal sheath and are positioned and interconnected in an arrangement providing a combination of electrical resistance per unit length of the well heater such that the heater is capable of generating heat at different rates along different portions of its length; and means for supplying electric current to said heating strands.

2. The heater of claim 1 in which at least two heating elements are arranged end-to-end and electrically connected in series.

3. The heater of claim 1 in which at least two heating elements are arranged side-by-side and electrically connected in series.

4. The heater of claim 1 in which at least two heating elements are arranged side-by-side and electrically connected in parallel.

5. The heater of claim 1 in which at least one of the heating elements have different resistance per unit of length.

* * * * *